(12) United States Patent
McKethan

(10) Patent No.: US 11,120,393 B2
(45) Date of Patent: *Sep. 14, 2021

(54) SYSTEM AND METHOD FOR INCREASING ASSET UTILIZATION USING SATELLITE AIDED LOCATION TRACKING

(71) Applicant: SkyBitz, Inc., Herndon, VA (US)

(72) Inventor: John McKethan, Coppell, TX (US)

(73) Assignee: SkyBitz, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,082

(22) Filed: Apr. 3, 2020

(65) Prior Publication Data

US 2020/0302383 A1 Sep. 24, 2020

Related U.S. Application Data

(63) Continuation of application No. 16/100,314, filed on Aug. 10, 2018, now Pat. No. 10,614,409, which is a continuation of application No. 13/960,041, filed on Aug. 6, 2013, now abandoned, which is a continuation of application No. 12/574,163, filed on Oct. 6, 2009, now Pat. No. 8,510,180.

(60) Provisional application No. 61/103,049, filed on Oct. 6, 2008.

(51) Int. Cl.
*G06Q 10/08* (2012.01)
*G06Q 10/06* (2012.01)
*G06Q 30/06* (2012.01)

(52) U.S. Cl.
CPC ......... *G06Q 10/0833* (2013.01); *G06Q 10/06* (2013.01); *G06Q 10/063* (2013.01); *G06Q 10/087* (2013.01); *G06Q 10/0838* (2013.01); *G06Q 30/06* (2013.01)

(58) Field of Classification Search
CPC .. G06Q 10/06; G06Q 10/063; G06Q 10/0631; G06Q 30/06; G05B 13/042; G05B 15/05; G05B 13/02
USPC ......... 705/7.11–7.13, 7.26, 7.31, 5, 28, 400; 700/33, 34, 36; 701/50, 117, 213
See application file for complete search history.

(56) References Cited

U.S. PATENT DOCUMENTS

| | | | | |
|---|---|---|---|---|
| 5,122,959 A * | 6/1992 | Nathanson | ............. | G08G 1/202 340/993 |
| 5,880,958 A * | 3/1999 | Helms | .................... | G08G 1/202 701/117 |
| 6,415,219 B1 * | 7/2002 | Degodyuk | ........... | G08G 5/0082 701/117 |
| 6,587,738 B1 * | 7/2003 | Belcea | ................ | B61L 27/0027 700/33 |
| 6,975,997 B1 * | 12/2005 | Murakami | ............. | B60L 53/30 705/5 |
| 7,528,715 B2 * | 5/2009 | Lee | ........................ | G06Q 10/00 340/539.18 |
| 7,561,069 B2 * | 7/2009 | Horstemeyer | ... | G06Q 10/06311 340/994 |

(Continued)

*Primary Examiner* — Olusegun Goyea
(74) *Attorney, Agent, or Firm* — Toering Patents PLLC

(57) ABSTRACT

A system and method for increasing asset utilization using satellite aided location tracking. Smart sensor technology incorporated into mobile tracking hardware affixed to an asset can be used to support decision processes related to management of multiple assets. Automated decision processes based on customized business rules can operate on asset positions at various defined landmark locations and customized geographical areas.

10 Claims, 5 Drawing Sheets

(56) References Cited

U.S. PATENT DOCUMENTS

| | | | | |
|---|---|---|---|---|
| 7,567,811 B2* | 7/2009 | Simpson | | H04W 99/00 455/456.1 |
| 7,898,411 B2* | 3/2011 | Brosius | | G06Q 10/0833 340/539.22 |
| 8,055,533 B2* | 11/2011 | Rust | | G05B 19/4182 705/13 |
| 2002/0161509 A1* | 10/2002 | Fawcett | | G06Q 10/0875 705/28 |
| 2003/0014288 A1* | 1/2003 | Clarke | | G06Q 10/06316 705/7.26 |
| 2003/0040944 A1* | 2/2003 | Hileman | | G06Q 10/08 705/5 |
| 2003/0069680 A1* | 4/2003 | Cohen | | G06Q 10/08 701/50 |
| 2003/0233189 A1* | 12/2003 | Hsiao | | G01C 21/26 701/521 |
| 2004/0024711 A1* | 2/2004 | Camping | | G06Q 10/087 705/64 |
| 2006/0059023 A1* | 3/2006 | Mashinsky | | G06Q 10/02 705/5 |
| 2006/0206387 A1* | 9/2006 | Peterkofsky | | G06Q 20/203 705/22 |
| 2007/0005200 A1* | 1/2007 | Wills | | B61L 27/0011 701/19 |
| 2007/0027593 A1* | 2/2007 | Shah | | B60W 50/00 701/29.4 |
| 2007/0150130 A1* | 6/2007 | Welles | | B61L 17/00 701/19 |
| 2007/0291985 A1* | 12/2007 | Krahnstoever | | H04N 7/181 382/103 |
| 2008/0027772 A1* | 1/2008 | Gernega | | G06Q 10/04 705/7.26 |
| 2008/0154692 A1* | 6/2008 | Logan | | B61L 17/00 701/19 |
| 2008/0294491 A1* | 11/2008 | Hersh | | G06Q 10/08 705/7.13 |
| 2008/0312820 A1* | 12/2008 | Kapoor | | G06Q 10/047 701/533 |
| 2009/0030770 A1* | 1/2009 | Hersh | | G06Q 10/087 705/7.13 |
| 2009/0082962 A1* | 3/2009 | Kim | | G01C 21/362 701/469 |
| 2009/0083091 A1* | 3/2009 | Rust | | G06Q 10/0631 705/7.13 |
| 2009/0099897 A1* | 4/2009 | Ehrman | | G06Q 10/06 705/7.15 |
| 2009/0099898 A1* | 4/2009 | Ehrman | | G06Q 10/06 705/7.15 |
| 2009/0143927 A1* | 6/2009 | Julich | | G06Q 10/06 701/19 |
| 2009/0157461 A1* | 6/2009 | Wright | | G06Q 10/06 705/7.23 |
| 2009/0189788 A1* | 7/2009 | Faus | | G08G 1/20 340/989 |
| 2009/0326991 A1* | 12/2009 | Wei | | G06Q 10/08355 705/5 |
| 2011/0093306 A1* | 4/2011 | Nielsen | | G06Q 10/06 705/7.13 |
| 2011/0130914 A1* | 6/2011 | Shah | | B60W 50/00 701/29.5 |
| 2013/0062474 A1* | 3/2013 | Baldwin | | B61L 29/282 246/122 R |
| 2013/0325740 A1* | 12/2013 | McKethan | | G06Q 10/0838 705/333 |
| 2016/0112837 A1* | 4/2016 | Varoglu | | H04W 4/90 455/404.2 |
| 2016/0210851 A1* | 7/2016 | Oshima | | G08G 1/13 |
| 2019/0005446 A1* | 1/2019 | McKethan | | G06Q 10/06 |

* cited by examiner

SYSTEM AND METHOD FOR INCREASING ASSET UTILIZATION USING SATELLITE AIDED LOCATION TRACKING This Application is a continuation of U.S. application Ser. No. 16/100,314, filed Aug. 10, 2018; which in turn is a continuation of U.S. application Ser. No. 13/960,041, filed Aug. 6, 2013; which in turn is a continuation of U.S. application Ser. No. 12/574,163, filed Oct. 6, 2009; which in turn claims priority to U.S. Provisional Application No. 61/103,049, filed Oct. 6, 2008. Each of the foregoing applications is incorporated by reference herein, in its entirety, for all purposes.

BACKGROUND

Field of the Invention

The present invention relates generally to monitoring and tracking and, more particularly, to a system and method for increasing asset utilization using satellite aided location tracking.

Introduction

Tracking mobile assets represents a growing enterprise as companies seek increased visibility into the status of movable assets (e.g., dry van trailers, refrigerated trailers, flatbed trailers, cargo containers, intermodal rail containers, frac tanks, ISO containers, chassis, roll off bends, tank trailers, rail cars, etc.). Visibility into the status of movable assets can be gained through mobile terminals that are affixed to the assets. These mobile terminals can be designed to generate position information that can be used to update status reports that are provided to customer representatives.

Mobile terminals can report this position information to a centralized location via a wireless communication network such as a satellite communication network. In general, satellite communication networks provide excellent monitoring capabilities due to their wide-ranging coverage, which can span large sections of a continent.

Management of these movable assets is key to producing a high return on investment. What is needed therefore is a mechanism for enabling an enterprise to monitor, track and optimize asset utilization.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Tracking mobile assets (e.g., trailers, containers, rail cars, etc.) represents a growing enterprise as companies seek to improve cost, safety and service. The tracking of these assets can be accomplished using mobile tracking hardware that can be affixed to the asset.

Figure 1:
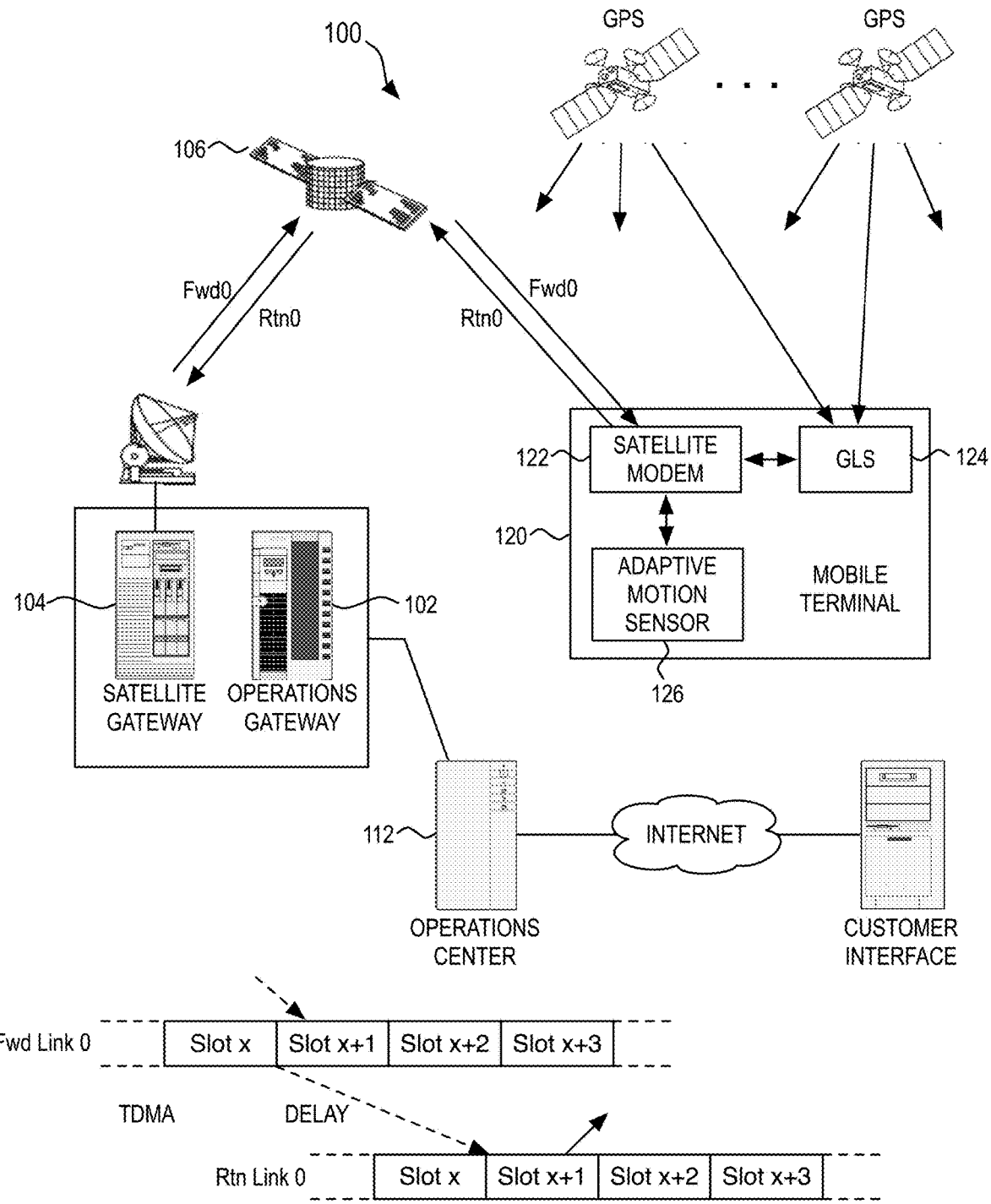
FIG. 1 illustrates an embodiment of a satellite network in communication with a mobile terminal on an asset.

FIG. 1 illustrates an embodiment of an asset tracking system that includes operations gateway 102, communicating with mobile terminal 120 on an asset. Communication between operations gateway 102 and mobile terminal 120 is facilitated by satellite gateway 104 at the ground station and satellite modem 122 in mobile terminal 120. Both satellite gateway 104 and satellite modem 122 facilitate communication using one forward and one return link (frequency) over communications satellite 106.

In one embodiment, the satellite communication is implemented in a time division multiple access (TDMA) structure, which consists of 57,600 time slots each day, per frequency or link, where each slot is 1.5 seconds long. On the forward link, operations gateway 102 sends a message or packet to mobile terminal 120 on one of the 1.5 second slots. Upon receipt of this message or packet, mobile terminal 120 would then perform a GPS collection (e.g., code phase measurements) using global locating system (GLS) module 124 or to perform sensor measurements and transmit the data back to operations gateway 102 on the return link, on the same slot, delayed by a fixed time defined by the network. In one embodiment, the fixed delay defines a length of time that enables mobile terminal 120 to decode the forward packet, perform the data collection and processing, and build and transmit the return packet.

In one embodiment, mobile terminal 120 can be configured to produce periodic status reports. In this configuration, mobile terminal 120 would wake up periodically, search for its assigned forward slot, perform data collection and processing, and transmit the status report on the assigned return slot. In another embodiment, mobile terminal 120 can be configured to produce a status report upon an occurrence of an event (e.g., door opening, motion detected, sensor reading, etc.). In this configuration, mobile terminal 120 would wake up upon occurrence of an event, search for an available forward slot, perform data collection and processing, and transmit the status report on the return slot corresponding to the identified available forward slot.

Upon receipt of a status report from mobile terminal 120, operations gateway 102 passes the information to operations center 112. Operations center 112 can then use the received GPS collection to calculate a position solution. This position solution along with any other status information (both current and historical) can be passed to a customer via the Internet. A detailed description of this communications process is provided in U.S. Pat. No. 6,725,158, entitled "System and Method for Fast Acquisition Position Reporting Using Communication Satellite Range Measurement," which is incorporated herein by reference in its entirety.

In one embodiment, mobile terminal 120 can also collect sensor measurements from sensors that are positioned at various points on the asset being tracked. In meeting the demand by customers for greater visibility into the status of assets, various sensor types can be used. For example, volume sensors, temperature sensors, chemical sensors, radiation sensors, weight sensors, light sensors, water sensors, truck cab ID indicators, odometer sensors, wheel sensors, etc. can be used to report the condition of cargo being transported, an environment of the asset, a condition of a service vehicle, etc. In general, these various sensors can be used to report status information or the occurrence of one or more events at the service vehicle to the mobile terminal for transmission to the centralized facility. The position information along with any sensor information can then be reported to the centralized facility periodically, upon request, or upon an occurrence of a detected event at the asset location.

As illustrated in FIG. 1, one of the sensors that can be used is adaptive motion sensor 126, which enables motion-activated location tracking. In general, adaptive motion sensor 126 determines whether an asset is moving or not. Together with the mobile terminal processor and GLS 124, adaptive motion sensor 126 can determine the arrival and departure times of an asset. When an asset begins to move, adaptive motion sensor 126 detects the motion by measuring vibration signals. Adaptive motion sensor 126 then sends a signal to the mobile terminal processor informing it that motion has started. The mobile terminal processor then records the time motion started, and signals to GLS 124 to collect code phase measurements.

The start time and the codephase measurements are sent over the satellite back to the operations center 124 where the codephase measurements are used to solve for a geographical position, and the start time is used to generate the departure time. Conversely, when adaptive motion sensor 126 determines motion has stopped it will again inform the mobile terminal processor to collect time and codephase measurements, and send the information back to operations center 112. Operations center 112 then solves for position, and the stop time is used to generate the arrival time. The arrival and departure times along with their associated geographical locations can be supplied to the user via the Internet.

In the motion-activated location tracking, adaptive motion sensor 126 has a layer of filtering that is capable of filtering out unwanted starts and stops such that mobile terminal 120 only transmits true arrival and departure information. For example, mobile terminal 120 can be configured to only transmit starts or stops when the change in motion detected by adaptive motion sensor 126 is maintained for a configurable percentage of time. In this manner, only accurate arrival and departure time information is transmitted by mobile terminal 120 using filtered results of adaptive motion sensor 126. This layer of filtering saves on unwanted transmissions, and hence power, bandwidth, and cost.

The mobile terminal can be configured to transmit a position report after the actual arrival or departure times when the motion sensor has reached its "no-motion" or "motion" times, respectively. The "motion" and "no-motion" times can be separately configurable, for example, from one minute up to two hours. For example, if the "motion" time is set at 15 minutes, then the mobile terminal will only transmit departure time information at the expiration of the 15-minute "motion" time period should the motion condition be valid for greater than a configurable percentage of time. This configurability can be used to allow more time to exit an area of interest, or allow more time at rest stops along the way. Once the motion sensor has determined that the mobile terminal has entered a "motion" state, the mobile terminal can then be configured to transmit status reports periodically (e.g., once every X minutes/hours).

The user-configurable "motion sensitivity" can be implemented as the percentage of time the asset needs to remain in motion during the "motion time" to signal motion. This is useful, for example, in maintaining a motion condition while stopped at a traffic light or a rest stop. Conversely, the user-configurable "no-motion sensitivity" can be implemented as the percentage of time the asset needs to remain in no-motion during the "no-motion" time to signal no-motion. This is useful, for example, in maintaining a no-motion condition while moving a trailer within a yard. A detailed description of this communications process is provided in U.S. Pat. No. 7,498,925, entitled "System and Method for Reporting a Status of an asset," which is incorporated herein by reference in its entirety.

In the present invention, the tracking mechanism provides movement information that can be used in automated decision processes that relate to asset location and utilization, thereby saving considerable fuel, equipment, and man-hour cost. In one example, the asset location information can be used to correlate value to pertinent landmark information. More generally, alert information can be generated when asset utilization is not optimized by geographical area or balanced for optimal regional requirements.

One example of a decision process support (DPS) tool application is an optimized asset application. This optimized asset application is based on a set of one or more customized business rules. In one embodiment, these customized business rules are established by a user through a web interface based application. In one example, an asset optimization application can include weighted business rules such as the following: Asset Distance from Truck, Asset Distance from Load Point, Asset Idle Time (or non-utilization), Asset Pool Assignment—Landmark (e.g., target number of assets assigned to Landmark), Pool Location Idles Days Target, Pool Location Turn-time (i.e., arriving to leaving time) Target, Asset Group Assignment, Trailer Status—Empty or Loaded, Cost per Mile Traveled, Revenue per Asset Day (e.g., based on value of freight), Revenue per Landmark, and Landmark Status (Pool Status) On/Off or Assigned Weight.

Each business rule can be assigned a weight by importance and can be used to measure and recommend the best assets for the job requirement. In one embodiment, the job requirement details to be measured are as follows, Truck position, Load point position (Origin), End point position (Destination), Asset positions, Distance, and Cost and Profitability.

Figure 2:
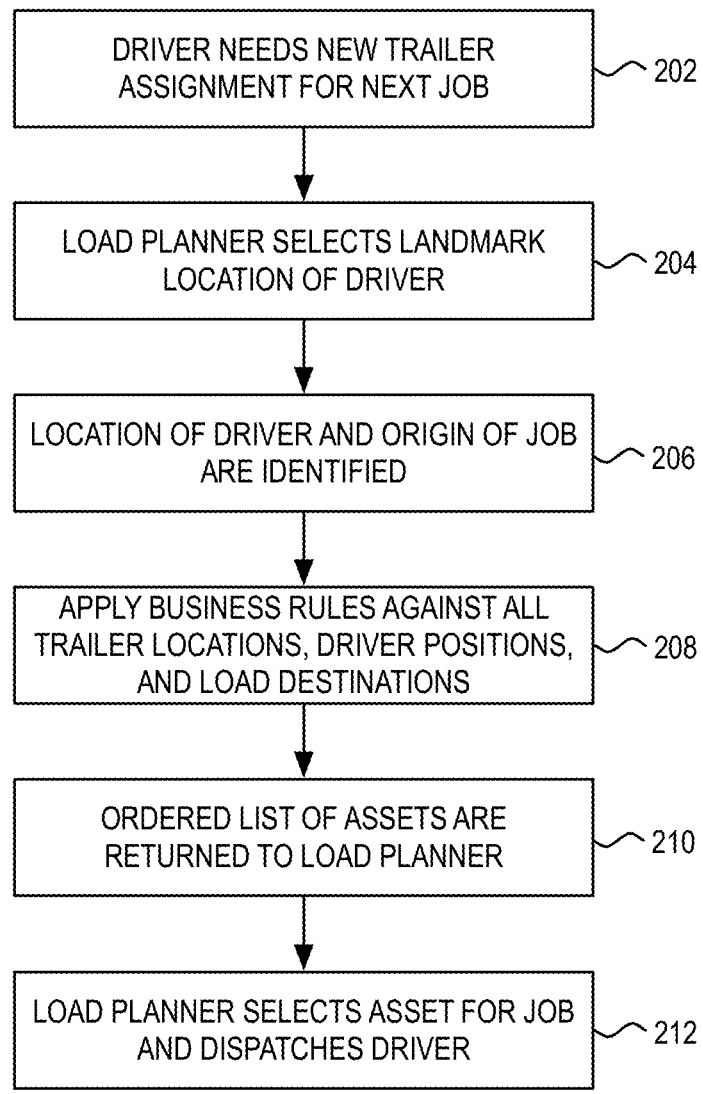
FIG. 2 illustrates a flowchart of an optimized asset process.

FIG. 2 illustrates an example workflow process based on a set of weighted business rules. As illustrated, the process begins at step 202 where a driver drops a trailer at a location and needs a new trailer assigned to him for the next job. At step 204, the load planner then selects the landmark location of the driver (e.g., 4-5 letter code). The location of the driver and origin of the job (i.e., load at point) are then provided to the DPS tool at step 206. The DPS tool then measures, at step 208, all trailer locations, driver positions, load destinations, distance from all assets against the business rules setup by the customer. At step 210, the list of sorted assets are then returned to the load planner (e.g., via XML). This list of assets is sorted based on the business rules defined for the customer. Finally, at step 212, the load planner selects the asset for the job and dispatches it to the driver.

As noted above, various business rules can be defined that relate to asset-specific statistics as well as asset-pool statistics. An example of an asset-specific statistic is a distance from an asset (e.g., trailer) to an asset transporter (e.g., truck). It is a feature of the present invention that business rules can be custom defined for individual landmark areas.

These landmark areas can be defined by the customer in identifying a pooling area (e.g., trailer yard) for a plurality of assets.

The adaptive motion sensor technology in the mobile terminals affixed to the assets enables accurate assessments of activity in relation to a defined landmark area. For example, the filtering of results produced by the adaptive motion sensor can more clearly identify when an asset has actually arrived at a destination defined by a landmark area. For example, only after an asset has achieved a no-motion condition for greater than a defined percentage of a period of time would the asset considered to be stopped. If the location of the stopped position is within a landmark boundary area, then the asset would be considered to have arrived at that landmark area. The time of arrival can be considered the time that the asset was first determined to have entered into a no-motion state.

This tracking mechanism is in contrast to perimeter crossing mechanisms that can only determine when an asset has crossed a geographic boundary threshold, which is distinct from the actual arrival point. Simple motion sensing is also inaccurate due to the potential for multiple starts and stops within a defined landmark area (e.g., movement within a trailer yard).

The statistics generated by assets within a landmark area can represent asset-pool statistics that can drive a business rule analysis for such a landmark area. As would be appreciated, the business rule can be separately and individually customized for each landmark area.

As an example, consider a business rule that relates to a turn-time target for a given pool location. This turn-time target can be defined as a target amount of time (e.g., days/hours) between an arrival and departure of an asset from a landmark area. Again, the arrival and departure times generated from a conventional boundary crossing methodology would yield inaccurate and inconsistent results. Statistics regarding the turn time of assets that enter and leave the landmark area can be used to determine the efficiency of an asset pool assigned to that landmark area. If the turn-time statistics indicate a result greater than a threshold, then the DPS tool can elevate assets in that landmark area for immediate or near-future assignment. Conversely, if the turn-time statistics indicate a result significantly less than a threshold, then the DPS tool can prevent assets in that landmark area from immediate or near-future reassignment.

As another example, consider an asset pool assignment for a landmark area. This asset pool assignment can identify a target number of assets for a given landmark area. If the number of assets at a given landmark area exceeds the threshold, then the DPS tool can elevate one or more assets in that landmark area for immediate or near-future assignment.

As these examples illustrate, the selection of assets to be assigned can be based on more than individual asset statistics. In the present invention, management of pools of assets is enabled. This area represents another example of a DPS tool application that relates to an asset pool management and geographical balance application.

In one embodiment, this application is designed to provide the user with near-real-time asset balance information based on the end user target pool and geographical goals. The application also leverages the GLS and adaptive motion sensor features described above, in having near-real-time updates of asset movement integrated with the DPS tool. With this integration, the customer can view network imbalances as they happen, thus providing the user with the ability to take corrective action to counteract such network imbalances.

In one embodiment, the DPS tool provides the end user with the ability to designate target asset quantities by Customer Pool—Landmark Location, or Customized Geographical Area, which can include multiple Landmark Locations within the Customized Geographical Area. The tool can display this information at two levels, Landmark level and Geographical level and can provide alerts when locations exceed a predetermined imbalance threshold.

For example, an end user landmark location or customized geographical area can have a target pool of 10 trailers. When the location or area exceeds 120% of the user defined target an alert is generated. Similarly, when the location or area drops below 80% of its user defined target an alert is generated. Alerts can also be generated based on the monitoring of other statistics such as average idle asset days at location or area per month, average cost per idle asset day, average asset turn-time, etc.

Figure 3:
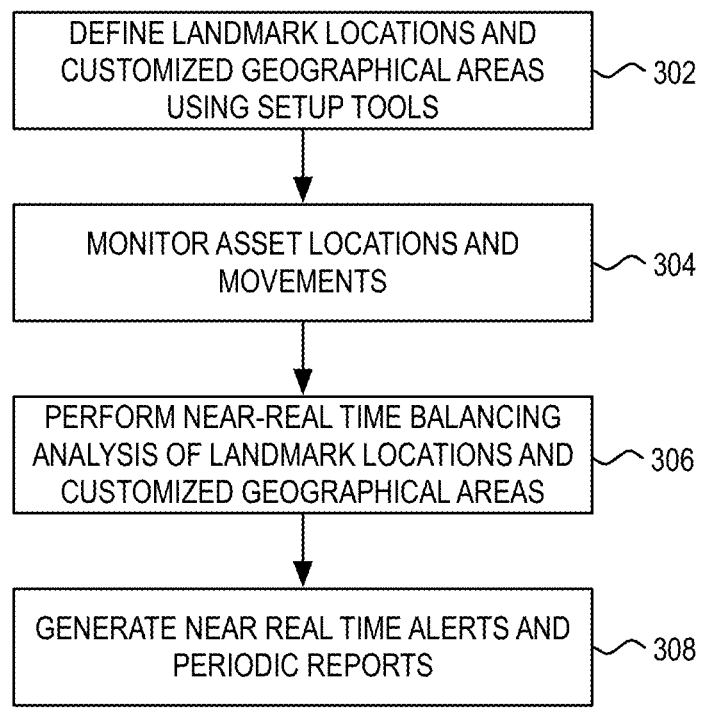
FIG. 3 illustrates a flowchart of an asset pool management and geographical balancing process.

FIG. 3 illustrates an example reporting process that incorporates asset pool management and geographical balance. As illustrated, the process begins at step 302 where a user defines landmark locations and/or customized geographical area using the setup tools.

In one embodiment, the setup tools are provided through a web driven graphical user interface. In general, the graphical user interface can enable the user to define a landmark location or customized geographical area using drawing tools that define an area using specified shapes, points, lines, etc. Where the graphical user interface is used to define a customized geographical area, the user can also provide inputs that select multiple landmark locations instead of defining an actual contiguous region. These multiple landmark locations can be specified using a pointing tool or through the selection from a graphical listing.

In this process, landmarks locations can be associated with one or more customized geographical areas. As such, the customized geographical areas can be mutually exclusive or can overlap in some fashion. In general, the customized geographical areas can be used to define separate regions that have independent significance from a monitoring perspective.

At step 304, the asset locations and movements are monitored via the asset tracking system. In one embodiment, the relevance of asset locations can be based on whether an asset is inside or outside of a defined landmark location or customized geographical area.

As noted above, the adaptive motion sensor technology in the mobile terminals affixed to the assets enables accurate assessments of an asset's location relative to a defined location or area. This accuracy is enabled by the filtering of adaptive motion sensor results to identify when an asset has actually arrived at a destination defined by a location or area. This processing and analysis is distinct from conventional boundary crossing mechanisms that can only infer, for example, that an asset has arrived at a destination location.

Based on this tracking data, the DPS tool can perform near-real-time balancing analysis of landmark locations and customized geographic areas at step 306. More specifically, the DPS tool can determine a number of assets that have arrived and are currently located within each landmark location and customized geographic area. This determined number of assets within each landmark location and customized geographic area can represent the pool of assets associated with each landmark location and customized geographical area.

Based on this analysis, the DPS tool can then compare the determined pool of assets within each landmark location and customized geographical area to any thresholds defined relative to a target pool of assets for each landmark location and customized geographical area. The customer can define a target pool of assets for each landmark location and customized geographical area. This target pool of assets can represent the customer's desires for an allocation of asset resources across the various landmark locations and customized geographical areas.

Using the determined pool of assets within each landmark location and customized geographical area, the DPS tool can then determine whether a threshold has been crossed relative to a target pool (e.g., over 120% or below 80%). If a threshold has been crossed, then a near-real-time alert can be generated by the DPS tool and provided to the customer at step 308. This alert can signal to the customer that a geographical imbalance exists amongst the assets and that an asset pool management adjustment may need to be made. As part of the reporting process, the DPS tool can also be designed to provide the customer with periodic reports (e.g., via email, voice messages, text messages, or the like) that can detail the current asset pool levels.

Figure 4:
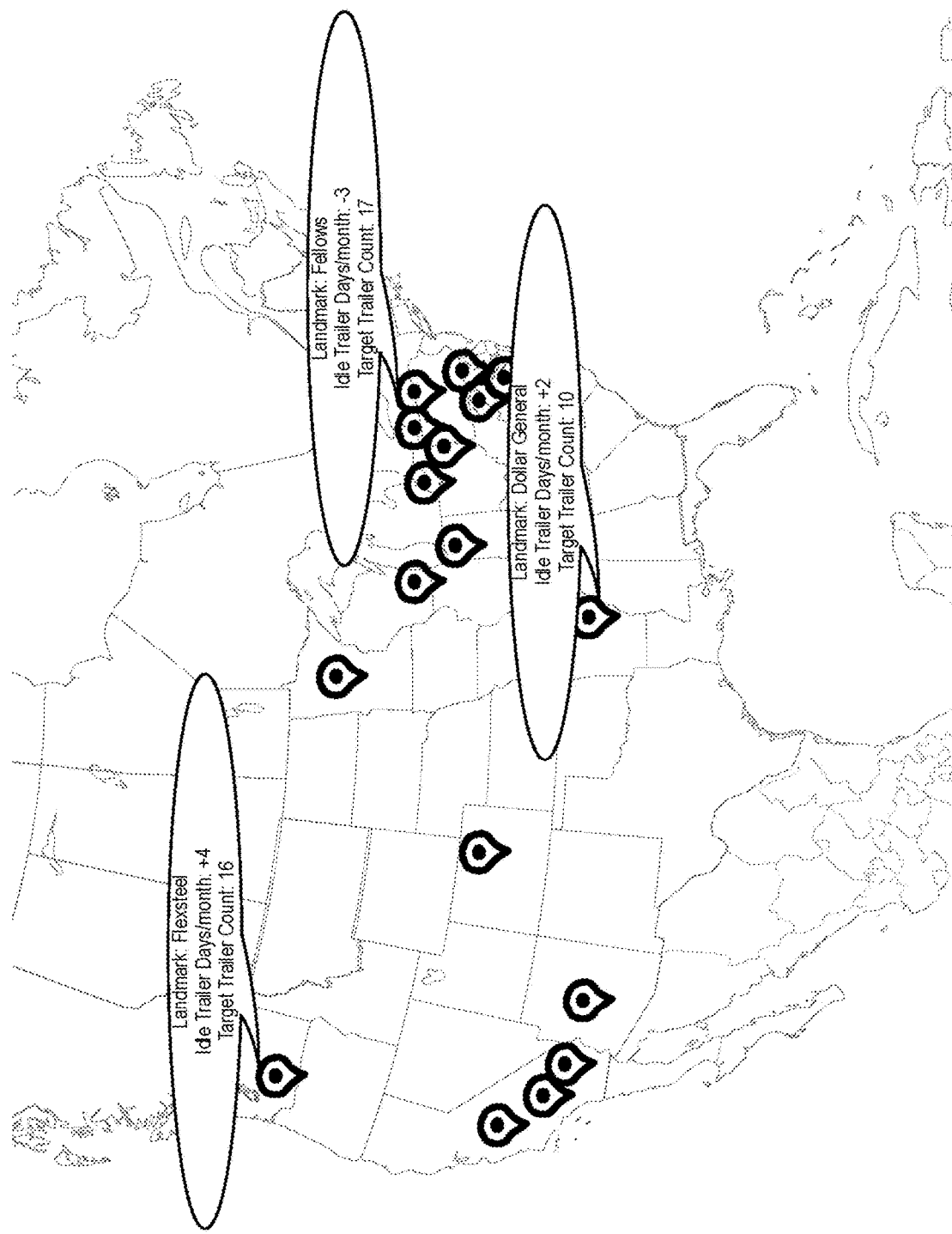
FIG. 4 illustrates an example user interface for reporting.

Asset pool management statistics can also be retrieved for the defined landmarks and/or customized geographical areas using a graphical user interface such as that illustrated in FIG. 4. In one embodiment, asset pool management statistics can be displayed visually using heat maps or other graphical illustrations that provide an indication of the relative measure of a measured statistic as compared to one or more thresholds. As would be appreciated, the asset pool management and geographical balancing process can be based on the number of assets alone or in combination with other statistics such as average idle asset days at location or area per month, average cost per idle asset day, average asset turn-time, etc. In general, any set of one or more statistics that provide an indication of asset utilization and non-utilization can be used to drive an asset pool management and geographical balancing application.

Another example of a DPS tool application is an evaluation of an asset turn-time between a departure and a return to a defined landmark location. This round trip asset turn-time bears some similarity to the turn-time within a landmark location.

Figure 5:
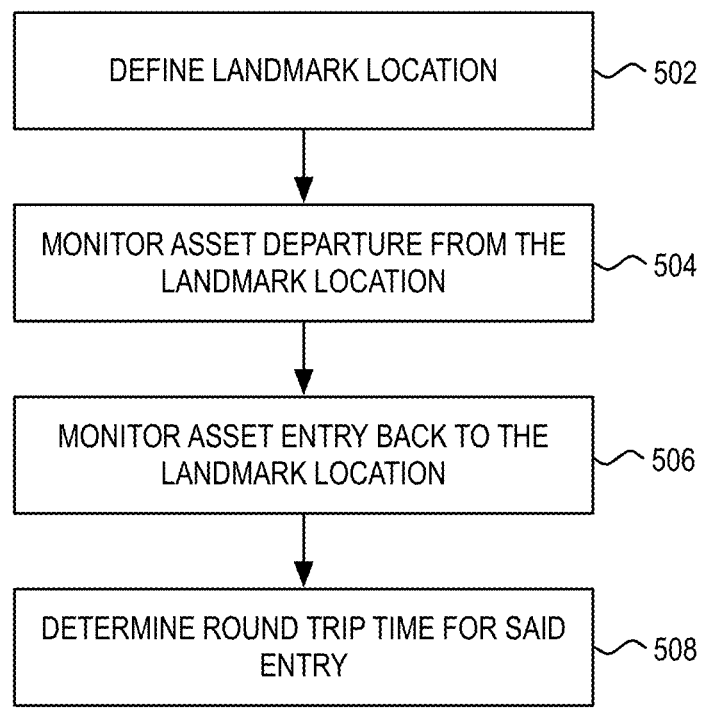
FIG. 5 illustrates a flowchart of a round trip turn time process.

To illustrated this feature of the present invention, reference is now made to the flowchart of FIG. 5 as applied to an application directed to border crossing asset management. As illustrated, the process begins at step 502 where a landmark location is defined. This landmark location can be defined at a border crossing point into and out of a country (e.g., border crossing between the United States and Mexico).

At step 504, an asset's departure from the border landmark location would be monitored. In effect, the report received from the border landmark location would log the start date and time that the asset enters Mexico. In one embodiment, this start time can be used to start a turn-time timer. At step 506, an asset's rentry into the United states would trigger a second report that logs the end date and time that the asset departs Mexico. This end date and time can then be used at step 508 to identify a round trip turn-time for the trip across the border.

In the example noted above, the round trip turn-time is based on exit and reentry to a particular landmark location. As multiple border crossings exist, landmark locations can be defined for each of the multiple border crossings. The multiple border crossings can then be grouped together as a customized geographical area. As noted above, the customized geographical area need not be contiguous. In this example, the round trip turn-time for the cross border trip can be based on exit and reentry to the customized geographical area.

Based on the determined round trip turn-times for a plurality of assets, the DPS tool can provide performance reports by Asset Turn-time by Trip, Average Asset Turn-time, Average Fleet Turn-time Performance, etc. For example, the report can specify that XYZ customer had 24 asset arrivals in a particular month and the average trailer turn-time in and out of Mexico for that location for the month was 8.73 days.

In addition to the above, the DPS application can also associate a landmark location with a trailer destination in Mexico. Turn-time performance for that landmark location can then be generated to distinguish the destination turn-time from the actual travel time.

Moreover, the user can also designate areas of Mexico that are no travel areas for their assets. The no travel areas can be designated using landmark or customized geographical areas. Alerts can also be set up for notifications as assets enter the no travel areas allowing the end user to identify a potential problem. Similarly, the user can designate preferred travel areas that are normally used by their assets. Thus, if an asset leaves those designated areas, an alert is generated and sent to the user.

Another example of a DPS tool application is a detention billing application. With this application, customers can set up detention billing rules for a landmark location or customized geographical area. For example, the detention billing rules can include, Landmark Free Days—free days asset can dwell at a landmark location or customized geographical area, Detention billing threshold—when an asset exceeds this number of days of detention at a landmark location or customized geographical area then billing begins, and Dollar amount to be billed per day. The user can also can set up an alert by landmark location or customized geographical area, with a customized message field, that sends an email or other message to key personnel stating that a detention billing event is about to begin. The end user can define when the alerts are to be sent. For example, 1-10 days before the detention event is to occur, each day during the detention event, or not to exceed number of alerts.

In one example, the detention billing module provides the end user with a report at the end of each month for detention billing purposes. The report can include landmark location or customized geographical area arrival and departure dates and time for all assets, Each asset idle time at the landmark location or customized geographical area for the month, Total number of idle days at the landmark location or customized geographical area, Total number of idle days above free time, Amount billed per idle day above free time, and Total amount to be billed for the month at the landmark location or customized geographical area.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   receiving, by an operations center via a communication network, a request for asset assignment from an asset transporter;
   receiving, by the operations center from a customer computing device, an identification of a plurality of customer defined landmark areas, wherein each of the plurality of customer defined landmark areas is associated with a separate geographic area;
   determining, by the operations center, a ranked list of assets in the plurality of customer defined landmark areas, wherein the assets are presently located in one of the plurality of customer defined landmark areas, wherein determining a ranked list of assets in the plurality of customer defined landmark areas comprises determining the ranked list of assets based on a plurality of rules, wherein the plurality of rules includes a rule based on a revenue generated per landmark area for a given time period;
   selecting, by the operations center, an asset from the ranked list of assets; and
   in response to the request for asset assignment, causing the selected asset to depart from one of the customer defined landmark area by transmitting, by the operations center via the communication network, an identification of the selected asset to the asset transporter.

2. The method of claim 1, wherein determining a ranked list of assets in the plurality of customer defined landmark areas comprises determining the ranked list of assets based on the plurality of rules, wherein the plurality of rules includes a turn time target that identifies a target amount of time between an arrival and departure of an asset from a landmark area.

3. The method of claim 1, wherein determining a ranked list of assets in the plurality of customer defined landmark areas comprises determining the ranked list of assets based on the plurality of rules, wherein the plurality of rules includes a rule based on a number of asset idle days at a landmark area.

4. The method of claim 1, wherein determining a ranked list of assets in the plurality of customer defined landmark areas comprises determining the ranked list of assets based on the plurality of rules, wherein the plurality of rules includes a threshold that relates to a target number of assets that are presently located in a customer defined geographic area, the customer defined geographic area including a plurality of customer defined landmark areas.

5. The method of claim 4, wherein determining a ranked list of assets in the plurality of customer defined landmark areas comprises determining the ranked list of assets based on the plurality of rules, wherein the plurality of rules including a landmark specific threshold that relates to a target number of assets that are presently located in the plurality of customer defined landmark areas.

6. The method of claim 1, further comprising:
   tracking, by the operation center, an entry or an exit of assets from a first of the plurality of customer defined landmark areas.

7. The method of claim 6, further comprising:
   determining, by the operations center, the ranked list of the assets based on a turn time target that identifies a target amount of time between an entry and an exit of an asset from the first of the plurality of customer defined landmark areas.

8. The method of claim 6, wherein tracking an entry or an exit of assets from a first of the plurality of customer defined landmark areas comprises:
   receiving position reports for each of a plurality of assets, wherein the position reports enabling tracking of an entry by some of the plurality of assets into a first of the plurality of customer defined landmark areas and an exit by some of the plurality of assets out of the first of the plurality of customer defined landmark areas.

9. The method of claim 8, wherein the position reports include a time that the asset arrived in the first of the plurality of customer defined landmark areas.

10. The method of claim 8, wherein the position reports include a time that the asset departed from the first of the plurality of customer defined landmark areas.

* * * * *